US007319796B1

(12) United States Patent
Sharp

(10) Patent No.: US 7,319,796 B1
(45) Date of Patent: *Jan. 15, 2008

(54) ADAPTIVE HYPERSPECTRAL DATA COMPRESSION

(75) Inventor: Mary Sharp, Escondido, CA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 685 days.

This patent is subject to a terminal disclaimer.

(21) Appl. No.: 10/933,123

(22) Filed: Sep. 2, 2004

Related U.S. Application Data

(63) Continuation of application No. 09/704,338, filed on Nov. 1, 2000, now Pat. No. 6,804,400.

(51) Int. Cl.
*G06K 9/36* (2006.01)

(52) U.S. Cl. ................................... 382/248

(58) Field of Classification Search ........ 382/232–253, 382/278, 100, 191, 155–159, 128–133; 706/145–155; 244/3.16–3.17; 250/334; 375/240.01–240.26
See application file for complete search history.

(56) References Cited

U.S. PATENT DOCUMENTS

| | | | |
|---|---|---|---|
| 5,513,128 A | 4/1996 | Rao | 382/232 |
| 5,832,182 A | 11/1998 | Zhang et al. | 706/50 |
| 6,008,492 A | 12/1999 | Slater et al. | 250/334 |
| 6,038,344 A | 3/2000 | Palmadesso et al. | 382/191 |
| 6,075,891 A | 6/2000 | Burman | 382/171 |
| 6,079,665 A | 6/2000 | Nella et al. | 244/3.17 |
| 6,167,156 A * | 12/2000 | Antoniades et al. | 382/232 |
| 6,169,817 B1 | 1/2001 | Parker et al. | 382/131 |
| 6,208,752 B1 | 3/2001 | Palmadesso et al. | 382/155 |
| 6,535,647 B1 | 3/2003 | Abousleman | 382/253 |

OTHER PUBLICATIONS

Abousleman, "Coding of hyperspectral imagery using adaptive classification and trellis-coded quantization," *Society of Photo-Optical Instrumentation Engineers*, vol. 3017, pp. 203-213, (1997).
Blake et al., "A Phenomenology-Based Approach to the Automated Recognition of Materials in HYDICE Imagery," *1998 IEEE International Geoscience and Remote Sensing Symposium Proceedings*, vol. 2, pp. 1004-1006, (1998).

(Continued)

*Primary Examiner*—Ishrat Sherali
(74) *Attorney, Agent, or Firm*—Cooley Godward Kronish LLP

(57) ABSTRACT

A method is disclosed herein for compressing spectral data corresponding to an image comprising a plurality of pixels. The method includes the step of creating a set of potential endmembers. A first plurality of the potential endmembers are identified as a first set of endmembers based upon their respective correlations with a first spectral signature of a first of the plurality of pixels. The first pixel is then represented as a combination of the first set of endmembers. Processing of the image preferably continues by identifying a second plurality of the potential endmembers as a second set of endmembers based upon their respective correlations with a second spectral signature of a second of the plurality of pixels. The second pixel is then represented as a combination of the second set of endmembers.

22 Claims, 19 Drawing Sheets

OTHER PUBLICATIONS

Canta et al., "Kronecker-Product Gain-Shape Vector Quantization for Multispectral and Hyperspectral Image Coding," *IEEE Transactions on Image Processing*, vol. 7, No. 5, pp. 668-678, May (1998).

Greenman et al., "Down on the Farm, Up on Technology," *New York Times on the Web*, web address: http://www.nytimes.com/library/tech/00/07/circuits/articles/13farm.html, Jul. 13, (2000).

Image Resolution Assessment and Reporting Standards (IRARS) Committee, "Multispectral Imagery Interpretability Rating; Reference Guide," web address: http://www.fas.org/irp/imint/niirs_ms/msiirs.htm, Feb. (1995).

Memon, "A Bounded Distortion Compression Scheme for Hyperspectral Image Data," *1996 International Geoscience and Remote Sensing Symposium*, vol. 2, pp. 1039-1041, (1996).

Reitz et al., "Hyperspectral compression using spectral signature matching with error encoding," *Society of Photo-Optical Instrumentation Engineers*, vol. 2821, pp. 64-73, (1996).

Roger et al., "Reliably estimating the noise in AVIRIS hyperspectral images," *Int. J. Remote Sensing*, vol. 17, No. 10, pp. 1951-1962, (1996).

Qian et al., "Fast three-dimensional data compression of hyperspectral imagery using vector quantization with spectral-feature-based binary coding," *Opt. Eng.*, vol. 35, No. 11, pp. 3242-3249, Nov. (1996).

\* cited by examiner

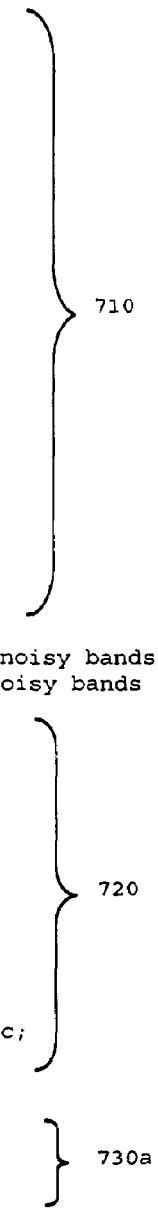

```
function asic(infile,nrow,ncol,nband,outfile);
%function to adaptively compress a hyperspectral image.
%infile is the filename of the image to be compressed.  It is assumed to be
%in 16 bit integer format with nrow rows, ncol columns and nband bands path(path,'c:/matlab/work');

% read in image
fid=fopen(infile,'r','b');
dat=fread(fid,'int16');
fclose(fid);
dat=reshape(dat,nrow,ncol,nband);

%compute noise level
nz=diag(hsnoise2(dat,10));

% compute signal level
dat=reshape(dat,nrow*ncol,nband);
dsig=cov(dat)

%compute signal to noise ratio
snr=diag(dsig)./nz;

% find bands with snr > 10
flg=snr>10;

% average noise level
nzlev=sqrt(sum(nz.*flg)/sum(flg))

% compute principal components with noisy bands eliminated
% first set covariance elements of noisy bands to zero
tsig=diag(flg)*dsig*diag(flg);

% compute eigenvectors
[vec val]=eig(tsig);

% sort eigenvalues
[p q]=sort(diag(val));

% keep largest 5
trvec=vec(:,q(nband-4:nband));

% compute principal component data
pc=reshape(dat,nrow*ncol,nband)*trvec;
pc=reshape(pc,nrow,ncol,5);

% unsupervised classifier
[label npts xmeans]=rgrow4(pc,3,40);
num=npts;
dat=reshape(dat,nrow,ncol,nband);
ycount=zeros(num,1);
ymeans=zeros(nband,num);
```

FIG. 8A

```
% count membership in each class and find class mean
for k=1:nrow
for l=1:ncol
   ycount(label(k,l))=ycount(label(k,l))+1;
   ymeans(:,label(k,l))=ymeans(:,label(k,l))+reshape(dat(k,l,:),nband,1);
end
end % normalize the mean and the membership as a fraction of image
for k=1:num
   ymeans(:,k)=ymeans(:,k)/ycount(k);
   ycount(k)=ycount(k)/nrow/ncol;
end % start with largest class
[p q]=max(ycount)
exclude=q;
b=ymeans(:,exclude);

% find 30 end members
% first unmix potential endmembers with selected set
for k=1:30
f=unconstr(b,reshape(ymeans',1,num,nband));
res=resid(b,f,reshape(ymeans',1,num,nband));
res=reshape(res,num,nband);

% compute residual rms
for l=1:num
rms(l)=norm(res(l,:)');
end

% find class with largest residual membership product
[ p q]=max(rms.*ycount');
exclude=[exclude q];
b=ymeans(:,exclude);
mean(rms)
end
```
⎫
⎬ 730b
⎭

```
% endmember selection complete
% now compress data using rcm
dat=reshape(dat,nrow*ncol,nband);
f1=zeros(nrow*ncol,32);
t0=cputime;
for k=1:nrow*ncol
[f ndx rms(k)]=rcm1pix(b,dat(k,:)',nzlev);
num(k)=max(size(f));
f1(k,[ndx 32])=f';
end
```
⎫ 770

```
%write out compressed file
rcmcompw(dat,b,f1,rms,nzlev,outfile)
cputime-t0
```
⎫ 790

FIG. 8B

```
function [label,npts,xmu]=rgrow(d,w,k)
% classify image into k regions based on means and covariances
% d is nband image, w is window size for computing
% intial classes, and k is the number of desired classes
% the returned values are:
%      label - an array which contains the class label for each pixel
%   npts - the number of classes found
%   xmu - the mean class vector for each class % get start time
t0=cputime;

% retrieve data dimensions ninfo=size(d);
nr=ninfo(1); % number of rows
nc=ninfo(2); %number of columns
nb=ninfo(3); %number of bands % initialize some parameters
kk=k; % desired number of classes
t=nb/2; % initial Bhattacharyya distance threshold %initial statistics calculation
% calculate mean and covariance for each w by w non overlapping
%window. note that MATLAB is vector oriented, so that the first mean function
% computes the average of each column, and the second mean function computes the
% average of the column averages. The covariance is computed by calling the cov
% function on an array which is w sqared rows by nb columns
m=1;
for k=1:w:nr-w+1
for l=1:w:nc-w+1
mu(m,:)=mean(mean(d(k:k+w-1,l:l+w-1,:)));
sig(m,:,:)=cov(reshape(d(k:k+w-1,l:l+w-1,:),w*w,nb));
m=m+1;
end
end nlabel=m-1; % current number of classes
label=1:nlabel; % assign numbers to classes
label1=label; % working array
npts=w*w*ones(nlabel,1); % number of points in each class %REDUCE # OF CLASSES. loop until number of classes has reached desired number
% go through each class and find all other classes whose Bhattacharyya distance is
% less than the threshold.
while (nlabel > kk)
m=0;
 for k=1:nlabel
if (npts(k) > 0)
   for l=k+1:nlabel
     if (npts(l) > 0)
```

FIG. 9A

```
bd=bdist(mu(k,:)',mu(l,:)',reshape(sig(k,:,:),nb,nb),reshape(sig(l,:,:),nb,nb));
    if (bd < t)

% compute new mean and covariance from old values
        del=(mu(l,:)-mu(k,:))';
                nnew=npts(k)+npts(l);
                dela=npts(l)/(nnew)*del;
                delb=-npts(k)/(nnew)*del;
                sigk=reshape(sig(k,:,:),nb,nb);
        sigl=reshape(sig(l,:,:),nb,nb);
                sig(k,:,:)=((npts(k)-1)*sigk+(npts(l)-
1)*sigl+npts(k)*dela*dela'+npts(l)*delb*delb')/(nnew-1);
        mu(k,:)=mu(k,:)+dela';

% update number of pixels in new combined class
                npts(k)=nnew;
                npts(l)=0;
      end %end if bd
      end %end if npts(l)
    end %end l loop % processing complete for current class. save mean and covariance values to
new array m=m+1;
    xmu(m,:)=mu(k,:);
    xsig(m,:,:)=sig(k,:,:);
    npts(m)=npts(k);
end  %end if npts(k)
end  %end k loop
% finished processing all current classes nlabel=m %new number of classes
% save new means and covariances
mu=xmu;
sig=xsig;
clear xmu;
clear xsig;

% increase threshold to continue combining classes
t=1.025*t;
end
%end nlabel loop
cputime-t0 %print processing time % now clean up labels. Find class whose mean value is closest match for each
pixel
% based on Euclidean distance. Note that a single pixel does not have a
covariance
% so we must use a first order metric
xmu=mu;
xsig=sig;
```

FIG. 9B

```
label1=label;
% sort classes based on value of last band.  This is intended to give some coherence to
% the class labels.  This means that class 1 has a value in the last band which is similar
% to value of the last band of class 2

[p q]=sort(xmu(:,nb));
r(q)=1:nlabel;

n=nr*nc;
d=reshape(d,n,nb);

%find closest class mean.  Process in sections based on smallest prime factor of total
% number of pixels.  This saves space because dist returns an array which is the number
% of classes by number of pixels in size.
n2=min(factor(n));
for k=1:n2:n
md=dist(xmu,d(k:k+n2-1,:)');
[p q]=min(md);
label(k:k+n2-1)=q;
end
label=reshape(r(label),nr,nc);

cputime-t0 % print total processing time
```

FIG. 9C

```
function bd=bdist(mu1,mu2,sig1,sig2)
%compute Bhattacharyya distance between two
%Gausssian distributions
% Bhattacharyya distance is composed of two parts -- one which depends
% on the difference in the means weighted by the inverse covariance, and
% which depends on arithmetic mean of the covariances divided by the geometric
% mean of the covariances % contribution from means
bd=.25*(mu2-mu1)'/(sig1+sig2)*(mu2-mu1);

% contribution from covariances
b=.5*log((det((sig1+sig2)/2)+eps)/(sqrt(det(sig1*sig2))+eps));
bd=bd+b;
```

FIG. 10

```
function f=unconstr(a,d)
%function for linear demixing of n band data
%returns m fractions using unconstrained least squares
%d contains the pixel data and a is the end
%member matrix %get size info
%number of end members
minfo=size(a);
nem=minfo(2);

% numer of rows columns and bands
ninfo=size(d);
kinfo=size(ninfo);
if kinfo(2) == 3
nr=ninfo(1);
nc=ninfo(2);
nband=ninfo(3);

%premultiply transpose by inverse of product of end
%member matrix and its transpose
bbb=(a'*a)\a';

f=bbb*reshape(d,nr*nc,nband)';
f=reshape(f',nr,nc,nem);
else
%premultiply transpose by inverse of product of end
%member matrix and its transpose
bbb=(a'*a)\a';
f(1:nem)=bbb*d;

end
```

FIG. 11

```
function [f,ndx,rms1]=rcm1pix(a,d,thrsh)
%function for residual correlation identification of n band data
%returns m fractions using constrained least squares
%d contains the pixel data and a is the end
%member matrix %get size info
%number of end members
t0=cputime;
minfo=size(a);
nem=minfo(2);
nband=minfo(1);

% compute correlation coefficient between pixel and each end member
k=1;
cc = corrcoef([d a]);
[cmax ndx(k)]=max(abs(cc(1,2:nem+1)));
%ff=unconstr(a,d);
%[cmax ndx(k)]=max(ff);

%find unconstrained fraction of best fit end member b=[a(:,ndx) ones(nband,1)];
bbb=(b'*b)\b';
f1=bbb*d;
fm=bbb*a;
r1=d-b*f1;
rm=a-b*fm;
rms1=std(r1);

% set up list of negative fraction end members
exclude=[];
% loop until residual rms is less than threshhold
while ((rms1 > thrsh) & (k<nem))
    % find endmembers which are still available for selection
    ndxc=setdiff(1:nem,union(ndx,exclude));
    % compute correlation coefficients
    cc = corrcoef([r1 rm(:,ndxc)]);
    %find maximum correlation
    [cmax nmax] = max(abs(cc(1,2:max(size(cc)))));
    k=k+1;
    ndx=[ndx ndxc(nmax)]; % add to endmember set
    % add dummy endmember of all ones to represent bias
    b=[a(:,ndx) ones(nband,1)];

%form least squares solution matrix
    bbb=(b'*b)\b';

% use to find fraction of each endmember
    f1=bbb*d;
    fm=bbb*a;
```

FIG. 12A

```
% compute residuals
    r1=d-b*f1;
  rm=a-b*fm;

% compute rms value
  rms1=norm(r1)/sqrt(nband);
  %test for negative fractions and divide EM set into keep and exclude sets
  test=find(im2bw(f1(1:max(size(ndx))),-1));
  keep=ndx(test);
  exclude=[exclude setdiff(ndx,keep)];
  ndx=keep;
  b=[a(:,ndx) ones(nband,1)];
  bbb=(b'*b)\b';

% recompute fractions and residuals with endmembers with positive fractions
  f1=bbb*d;
  fm=bbb*a;
    r1=d-b*f1;
  rm=a-b*fm;
  rms1=std(r1);
end
f=f1;

cputime-t0;
```

```
function rcmcompw(dat,ems,f,rms,thresh,outfile);
%function to write out a compressed hyperspectral image.
%first is nline,nsamp,nband, and nem in 16 bit int format
%then ems in 32 bit float format.  this is followed by a list of gains
%and biases for each member
%finally for each pixel is a bit string with a 1 if corresponding
%end member is used or else 0.  a 1 in the nem+1 position means that
%the pixel is not compressed.  this is followed by the coefficients for
%the appropriate end members in 8bit unsigned int format.
info=size(dat);
nline=info(1);
nsamp=info(2);
nband=info(3);
info=size(ems);
nem=info(2);
f=reshape(f,nline*nsamp,nem+1);
dat=reshape(dat,nline*nsamp,nband);

%compute gains and biases
test=find(im2bw(rms,thresh));
f(test,:)=0;
cmin=min(f);
cmax=max(f);
gain=255./(cmax-cmin);
bias=-cmin*255./(cmax-cmin);

%convert fractions to 8 bit integer
for kk=1:nem
  %  f(:,kk)=round(f(:,kk)*gain(kk)+bias(kk));
end %now write out file
fid=fopen(outfile,'w','b');
count=fwrite(fid,[nline nsamp nband nem],'uint16');
count=fwrite(fid,ems,'float32');
count=fwrite(fid,gain,'float32');
count=fwrite(fid,bias,'float32');

for kk=1:nline*nsamp
   bflag=zeros(1,nem+1);
   ndx=find(f(kk,:));
   bflag(ndx)=1;
   if (rms(kk) > thresh)
      bflag(nem+1)=1;
      count=fwrite(fid,bflag,'ubit1');
      count=fwrite(fid,dat(kk,:),'int16');
   else
      count=fwrite(fid,bflag,'ubit1');
      count=fwrite(fid,round(f(kk,ndx).*gain(ndx)+bias(ndx)),'uint8');
   end
end
fclose(fid);
```

FIG. 13

ADAPTIVE HYPERSPECTRAL DATA COMPRESSION

CROSS-REFERENCE TO RELATED APPLICATION

This application is a continuation application of U.S. patent application Ser. No. 09/704,338 entitled ADAPTIVE HYPERSPECTRAL DATA COMPRESSION, filed Nov. 1, 2000 now U.S. Pat. No. 6,804,400, which is incorporated herein by reference in its entirety.

FIELD OF THE INVENTION

The present invention relates to the field of data compression, and more particularly to a method and system for adaptively compressing and decompressing hyperspectral image and other data.

BACKGROUND OF THE INVENTION

It has recently become possible to commercially obtain satellite and aerial images of terrain of interest from a number of sources. For example, certain large farms currently use satellite images provided by Landsat, the system of land-observing satellites operated by the federal government. Landsat satellites orbit the earth at approximately 900 km., and provide images in which each pixel represents a square area of between 1 $m^2$ and 1E6 $m^2$ (a pixel area of 100 $m^2$ is common for systems designed for land-use purposes). Visible, near-infrared, shortwave infrared, thermal infrared sensors deployed on such satellites can detect, among other things, the spectral reflectance, temperature, and other physical characteristics of specified terrestrial areas.

The sensors used in generating the images used for many commercial purposes are typically characterized as either "multispectral" or "hyperspectral". Multispectral sensors collect images of a terrain or landscape and provide a handful of wide spectral bands of imagery. These bands encompass the visible, short wave infrared, and, in some cases, thermal infrared portion of the electromagnetic spectrum. Similarly, hyperspectral sensors typically provide hundreds of narrow spectral bands of hyperspectral imagery spanning the visible, near-infrared, and shortwave infrared portion of the electromagnetic spectrum. Such sensors can produce enormous amounts of information needing to be transmitted on a limited bandwidth cross-link or down-link channel. For example, the Earth Observing System ("EOS"), which is currently scheduled to begin operation by 2001, will carry a high-resolution hyperspectral imager (the "Hyperion") capable of resolving 220 spectral bands. The Hyperion is expected to produce a maximum output data rate of at least several hundred Mbit/s.

Such high data rates not only increase the complexity of required communications infrastructure, but may also strain the capacity of ground data storage and processing facilities. It will of course be appreciated that data compression of some type would at least partially alleviate these difficulties.

Many image compression algorithms have been designed and implemented over the years in order to address the storage and transmission needs of monochromatic and multispectral imaging sensors. Most of these algorithms have focused on the spatial character of the imagery and limitations in the human visual system. Hyperspectral imagery shares certain characteristics with monochromatic and multispectral imagery, but also possesses certain other characteristics providing additional opportunities for compression of the constituent spectral data. For example, it is well recognized that hyperspectral imagery typically exhibits high levels of spectral correlation. Like other imagery, hyperspectral imagery also exhibits some level of spatial correlation, but such correlation is often less than that inherent in other types of images. The data redundancy resulting from spectral and spatial correlation has been exploited by certain algorithms to provide relatively high compression ratios with insubstantial loss of information content. Such algorithms have been based upon vector quantization, use of the discrete cosine transform followed by trellis coded modulation, spectral re-ordering and linear prediction, and spectral signature matching.

However, existing data compression algorithms may fail to consider all parameters of an image potentially relevant to optimizing compression ratios. For example, such algorithms are not known to utilize image noise statistics for the purpose of ensuring that any compression loss be related substantially to image noise rather than to scene information.

SUMMARY OF THE INVENTION

In summary, the present invention pertains to a method of compressing spectral data corresponding to an image comprising a plurality of pixels. The method includes the step of creating a set of potential endmembers. A first plurality of the potential endmembers are identified as a first set of endmembers based upon their respective correlations with a first spectral signature of a first of the plurality of pixels. The first pixel is then represented as a combination of the first set of endmembers. Processing of the image preferably continues by identifying a second plurality of the potential endmembers as a second set of endmembers based upon their respective correlations with a second spectral signature of a second of the plurality of pixels. The second pixel is then represented as a combination of the second set of endmembers.

In another aspect, the present invention relates to a compression system for compressing spectral data corresponding to an image comprising a plurality of pixels. The compression system includes a database including a set of potential endmembers. An adaptive linear unmixing module operates to identify a first plurality of the potential endmembers as a first set of endmembers based upon correlation of the first plurality of potential endmembers with a first spectral signature of a first of the plurality of pixels. The compression system further includes an encoder for representing the first pixel as a combination of the first set of endmembers.

The present invention also pertains to a method for reconstructing an image comprising a plurality of pixels from a compressed data stream. In an initial step of this method a set of endmembers are extracted from the data stream. Information identifying a first plurality of the endmembers corresponding to a first pixel of said plurality of pixels is also extracted from the data stream. A first plurality of endmember coefficients, each of such endmember coefficients corresponding to one of the first plurality of endmembers, is also extracted from the data stream. Each of the first plurality of endmembers is multiplied by a corresponding one of the first plurality of endmember coefficients to produce a first plurality of intermediate products. The method further includes the step of combining the first plurality of intermediate products.

BRIEF DESCRIPTION OF THE DRAWINGS

In the accompanying drawings:

FIGS. 8A-8B are a computer program listing of a MATLAB routine which implements the adaptive hyperspectral data compression process of the present invention.

FIGS. 9A-9C are a computer program listing of a MATLAB routine which implements the adaptive hyperspectral data compression process of the present invention.

FIG. 10 is a computer program listing of a MATLAB routine which implements the adaptive hyperspectral data compression process of the present invention.

FIG. 11 is a computer program listing of a MATLAB routine which implements the adaptive hyperspectral data compression process of the present invention.

FIGS. 12A-12B are a computer program listing of a MATLAB routine which implements the adaptive hyperspectral data compression process of the present invention.

FIG. 13 is a computer program listing of a MATLAB routine which implements the adaptive hyperspectral data compression process of the present invention.

DETAILED DESCRIPTION OF THE INVENTION

System Overview

Figure 1:
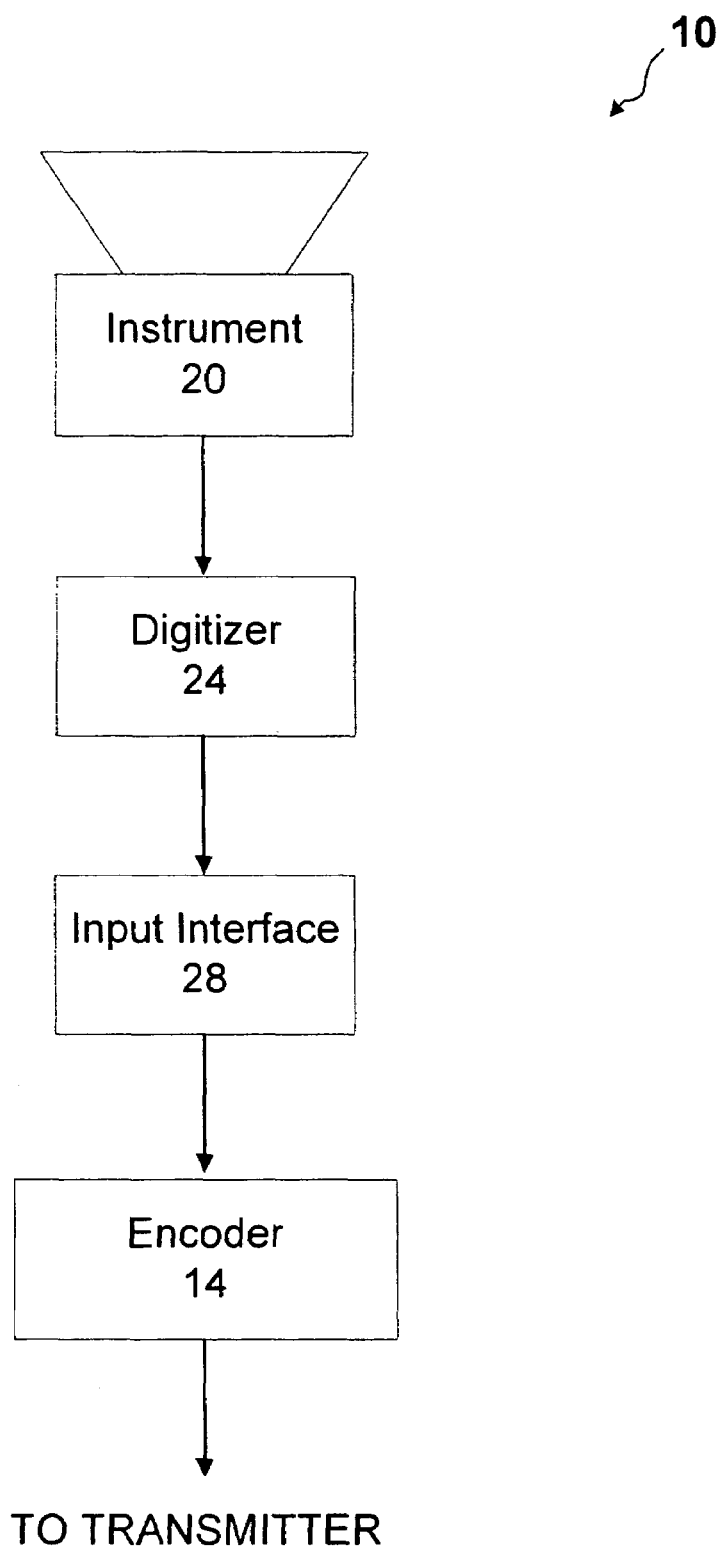
FIG. 1 is a high-level block diagram of an imaging system for producing spectral images disposed to be adaptively compressed by an encoder in accordance with the teachings of the present invention.

FIG. 1 is a high level block diagram of an imaging system 10 for producing spectral images disposed to be adaptively compressed by an encoder 14 in accordance with the teachings of the present invention. The encoder 14 forms part of a codec, e.g., a coder-decoder pair. In an exemplary embodiment, the imaging system 10 and encoder 14 are used in a spacecraft or satellite, while a complementary decoder is disposed within a terrestrial ground station or other receiving system. The encoder 14 is operative to adaptively compress images obtained using data collected by an instrument 20.

The instrument 20 may be realized using any of various types of instrument systems which provide signals indicative of spectral reflectance, such as multi-band digital imaging cameras, color television cameras, multi-band infrared scanners, visible light microscopes, spectroradiometers and the like. Although in the preferred embodiment of FIG. 1 the instrument 20 is disposed to measure spectral reflectance, in alternate implementations other spectral characteristics (e.g. spectral emission) may be measured and processed in accordance with the present invention. Signals are provided by the instrument 20 to a digitizer 24, which produces a set of image pixels defining the optical characteristics of the object or terrain of interest.

As is indicated by FIG. 1, a set of image pixels from the digitizer 24 is provided to an input interface 28. The hyperspectral image data 26 received through the input interface 28 is provided to the encoder 14, a computer system capable of appropriate processing, such as image processing. In the alternative, discrete logic devices, specially designed integrated circuits, and commercially available processors can also be used to implement the systems and methods consistent with this invention.

The image data 26 in a single image pixel provided to the encoder 14 by the digitizer 24 consists of N data samples (typically between 10 and 200) which collectively form a hyperspectral "signature" of the image pixel. Each data sample corresponds to the reflectance or ratio of emission of photons from the object as compared to the photons illuminating the surface or terrain of interest at some spectral wavelength. As is described hereinafter, the encoder 14 then operates to adaptively compress the received hyperspectral image data 26 and to provide the resultant compressed image data to a transmitter (not shown) aboard the spacecraft or satellite.

Adaptive Hyperspectral Data Compression

Figure 2:
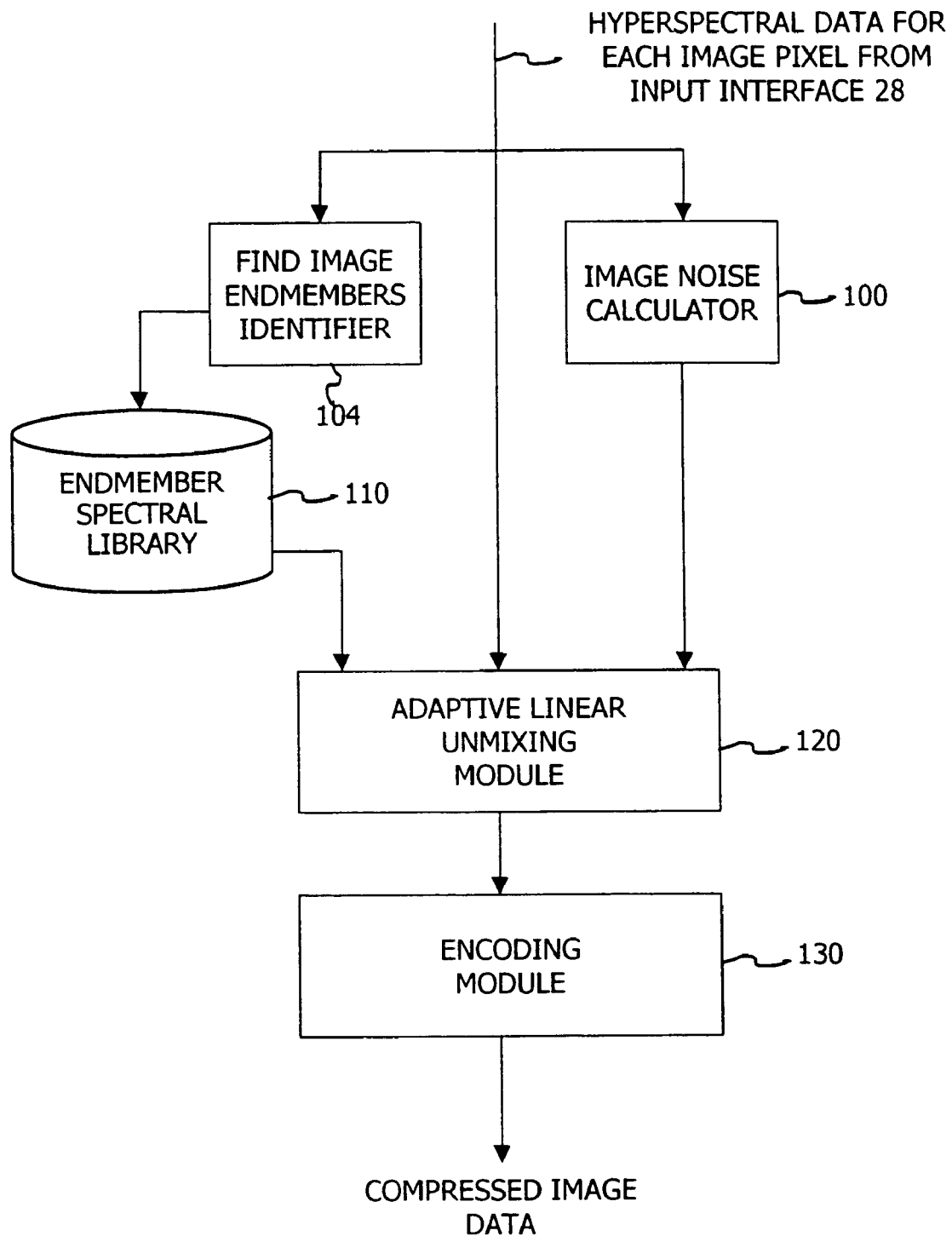
FIG. 2 is a generalized block diagram representation of the functional blocks of an encoder used in adaptively compressing hyperspectral image data in accordance with the present invention.

FIG. 2 is a generalized block diagram representation of the functional blocks of the encoder 14 used in adaptively compressing the hyperspectral image data 26 in accordance with the present invention. In a preferred implementation, each such functional block of the encoder 14 is implemented as a software routine disposed to execute on a computer system of the type described above. Referring to FIG. 2, an image noise calculator 100 determines certain noise statistics for each band of the received hyperspectral image data 26 and uses such statistics to calculate an overall image noise level. The encoder 14 further includes an image endmember identifier 104 for deriving a set of spectral endmembers from the received hyperspectral data for storage in a spectral library 110. A linear unmixing module 120 is operative to represent each image pixel using a linear combination of endmembers from the spectral library 110. As is described further below, the processing carried out by the linear unmixing module 120 takes advantage of the spectral and spatial correlation present in hyperspectral imagery to decorrelate the image using linear regression. The linear unmixing module 120 also uses the image noise level provided by the image noise calculator 100 in determining the number of endmembers selected to represent each pixel, thereby effecting adaptive data compression on a pixel-by-pixel basis. Once a particular set of endmembers and associated coefficients been selected to represent each image pixel, the entire image is encoded by an encoding module 130 and the resultant compressed image data provided to a transmitter (not shown).

Image Noise Calculation

Figure 3:
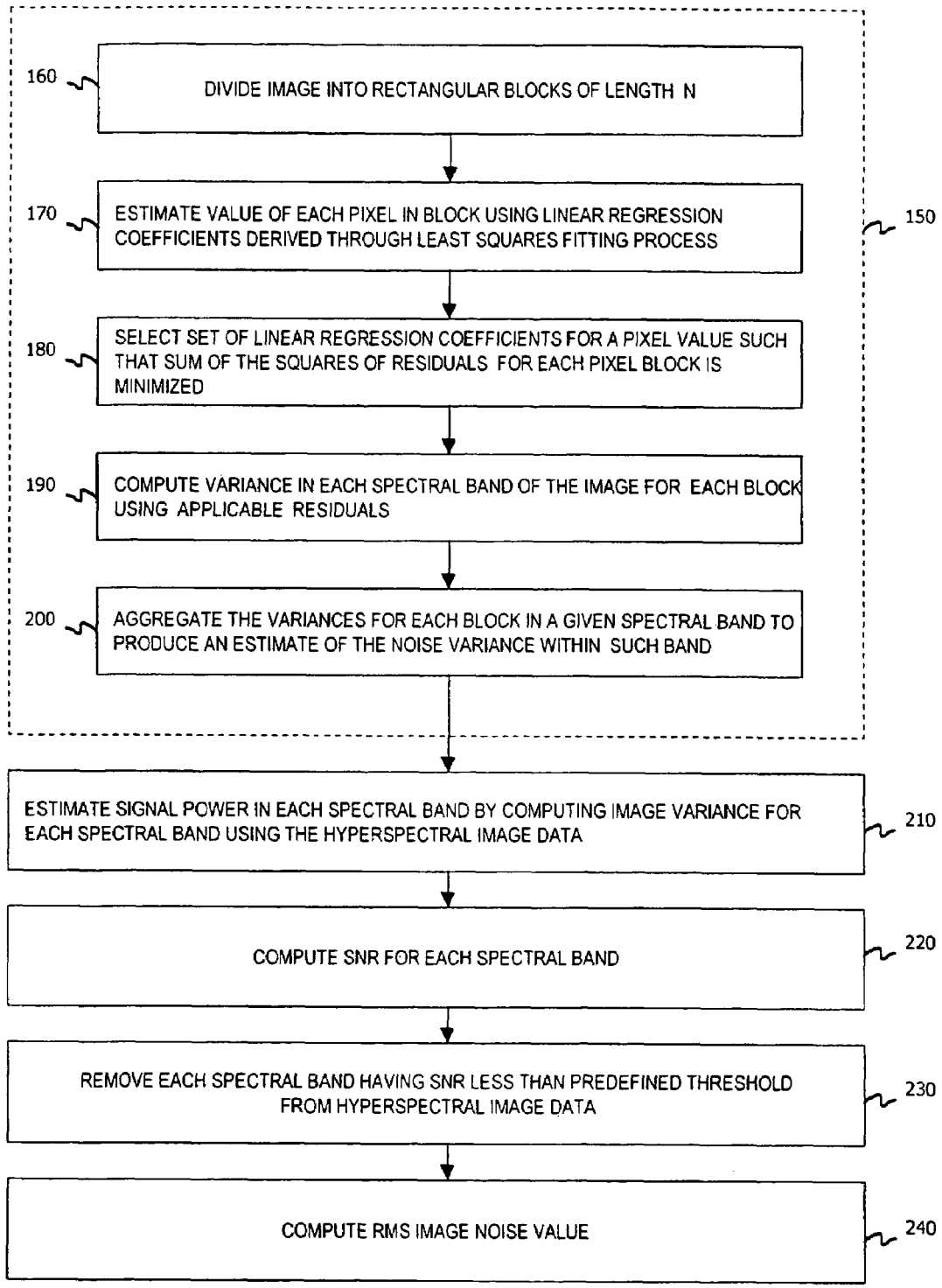
FIG. 3 is a flow chart of an image noise calculation process performed by an image noise calculator included within the encoder of FIG. 2.

FIG. 3 is a flow chart of an image noise calculation process performed by the image noise calculator 100. This noise calculation process is initiated by estimating the noise variance in each of the N spectral bands of the image to be compressed (step 150). Such estimation is preferably effected using an automated technique which contemplates determining separate linear regression coefficients for distinct blocks of pixels. See, for example, "Reliably Estimating the Noise in AVIRIS Hyperspectral Images," by Roger, R. E. and Arnold, J. F., Int. J. Remote Sensing, 1966, Vol. 17, No. 10, 1951-1962. First, the entire image is divided into small, rectangular, continuous, non-overlapping blocks of pixels of length L, where L is typically between 8 and 16 (step 160). Within each such pixel block, the value of each pixel is estimated in each of the N spectral bands using a set of four linear regression coefficients derived using a least squares fitting process (step 170). Specifically, two of such coefficients correspond to the values of the subject pixel in the bands adjacent the band of interest, one coefficient corresponds to the value of the pixel in an adjacent spatial location in the band of interest, and one coefficient corresponds to a bias term. During the fitting process, which is preferably conducted separately for each of the N spectral bands, a residual difference between each pixel value in a given band and its predicted value in such band is computed and is assumed to be noise energy introduced by the imaging chain. The fitting process is performed by selecting the four linear regression coefficients associated with a pixel value such that the sum of the squares of the residuals for each pixel block is minimized (step 180).

Once the fitting process has been completed for all pixel blocks, the variance in each of the N spectral bands of the image is computed for each block using the applicable residuals (step 190). Next, the variances for each block in a given spectral band are aggregated to produce an estimate of the noise variance within such band (step 200). An image variance is then computed for each of the N spectral bands using the hyperspectral image data 26 in order to yield an estimate of the signal power in each such band (step 210).

A signal to noise ratio (SNR) for each spectral band is then computed by dividing the image variance by the noise variance (step 220). Any spectral band having a SNR less than a predefined threshold (e.g., 10) is excluded from the hyperspectral image data 26 provided to the adaptive linear unmixing module 120. Removal of such "noisy" bands prevents image noise from corrupting the unmixing process described below (step 230). In addition, an RMS image noise value is computed by determining the square root of the mean of the noise variance across all N spectral bands (step 240). This RMS image noise value may be considered to be one standard deviation (i.e., one "sigma level") of the noise energy associated with the image. Assuming a Gaussian noise distribution, more than 99% of the image pixels would be expected to be characterized by noise levels not exceeding three sigma levels. As is described further below, in a preferred implementation the adaptive linear unmixing module 120 operates to select endmembers for a given image pixel until the residual difference between the actual value of such image pixel and its estimated value using a linear combination of such endmembers drops below a predefined target value (e.g., 1, 2 or 3 sigma levels).

Endmember Selection

As mentioned above, the image endmember identifier 104 functions to derive a set of spectral endmembers from the received hyperspectral image data 26. Although a preferred embodiment of the invention contemplates use of the image endmember identifier 104 to derive endmembers from the received hyperspectral image data 26, endmembers may alternately be physically derived directly from the scene. Such direct physical derivation may be conventionally effected using field spectrometers, by recourse to a material database, or by using other imagery of the scene. In alternate embodiments, endmembers may be derived from the spectra of individual or multiple pixels using automated, semi-automated, or manual techniques.

Figure 4A:
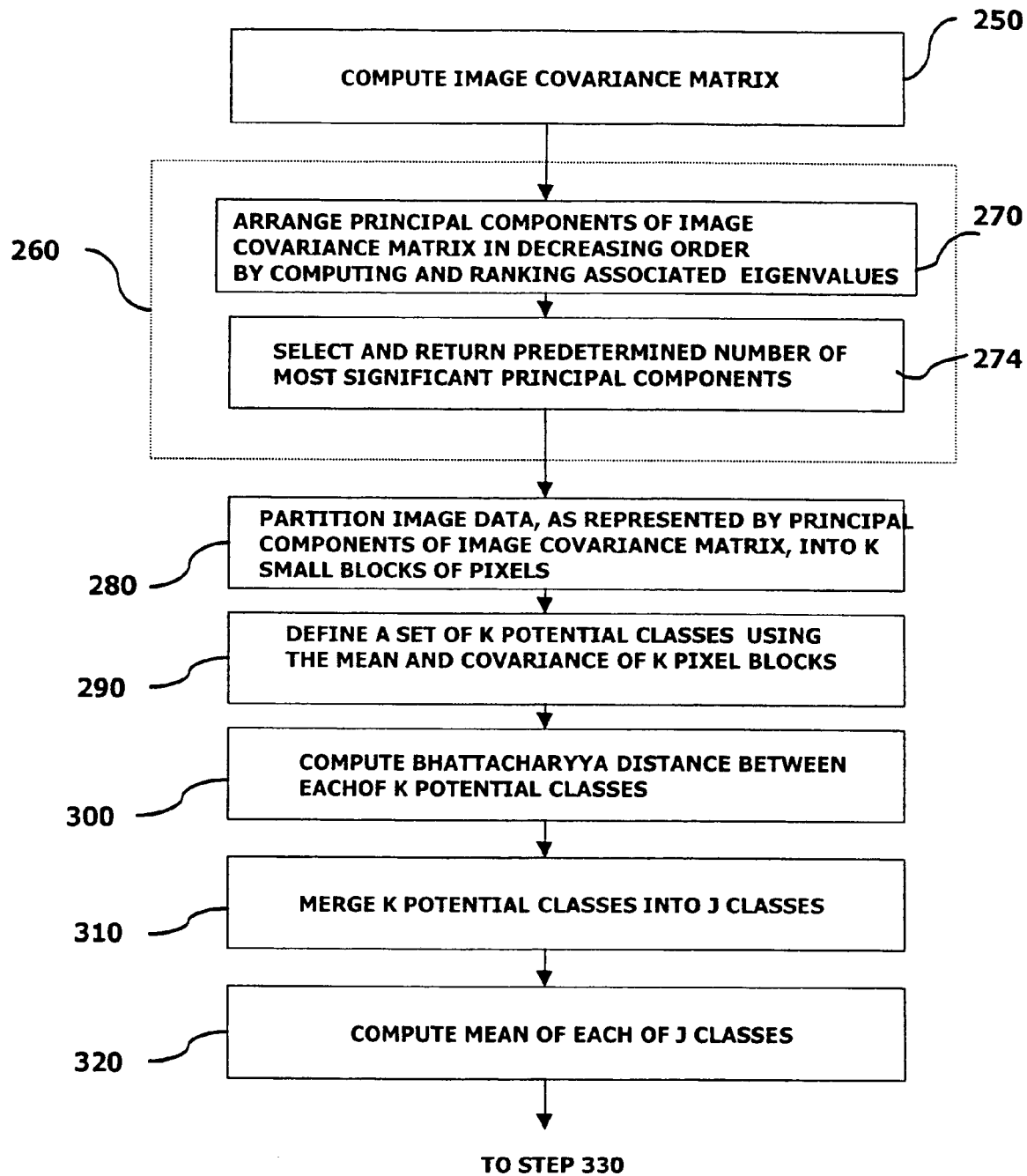
FIGS. 4A and 4B collectively comprise a flow chart of an endmember selection process carried out by an image endmember identifier included within the encoder of FIG. 2.
Figure 4B:
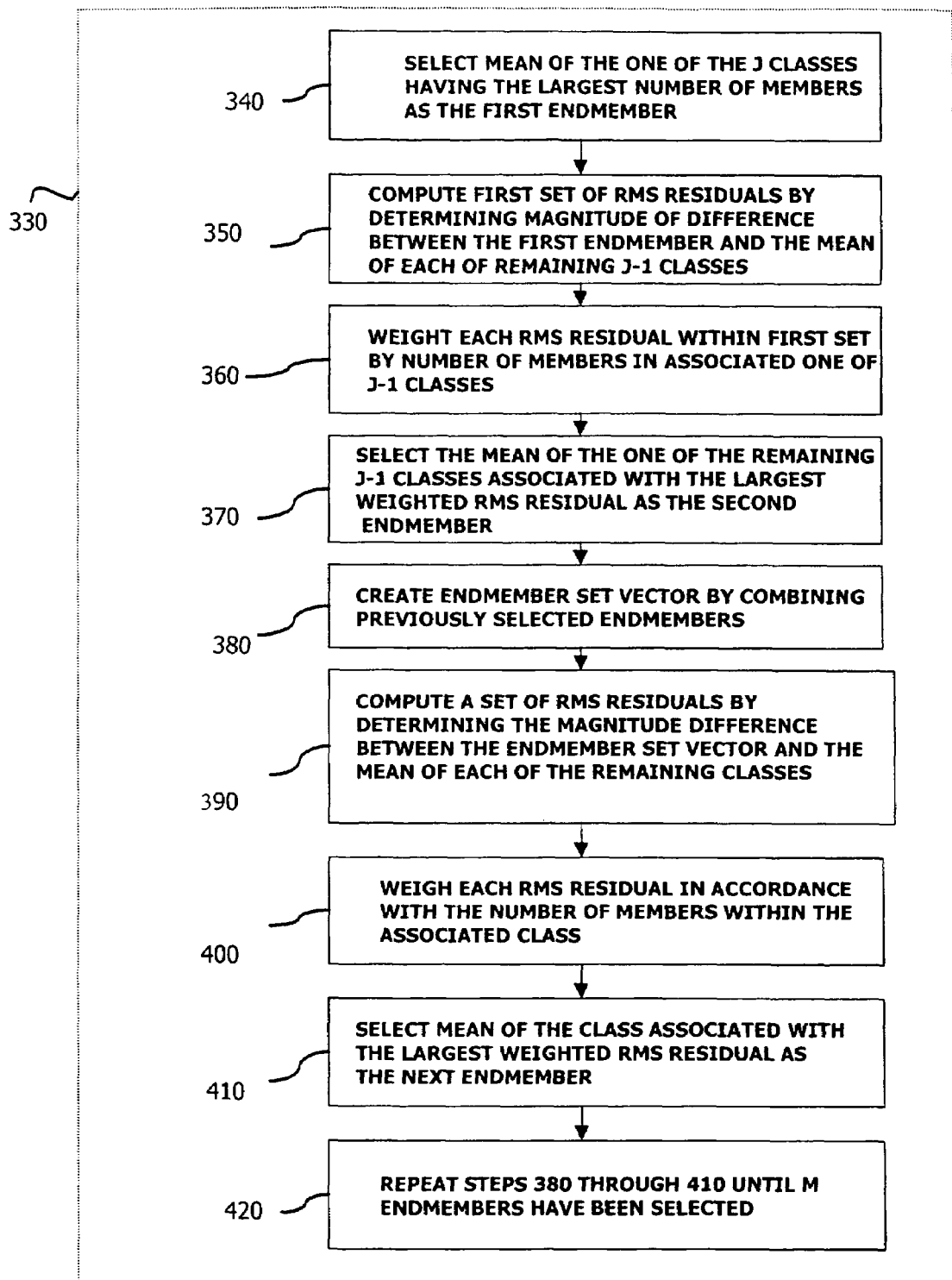

FIGS. 4A and 4B collectively comprise a flow chart of an endmember selection process carried out by the image endmember identifier 104. The selection process begins with computation of an image covariance matrix:

$$\sum_{ij} = \frac{1}{Npix-1} \sum_{k=1}^{Npix} (d_{k,i} - \mu_i)(d_{k,j} - \mu_j) \quad (1)$$

where $d_{k,i}$ represents the value of the kth pixel in the ith spectral band, $\mu_i$ represents the mean of the ith spectral band, and Npix represents the number of pixels in the image (step 250). Next, the image covariance matrix is transformed into a set of constituent principal components (step 260). In a preferred implementation, this transform is effected through an eigenvector or principal component decomposition of the image covariance matrix defined by Equation (1). Specifically, the eigenvalues of the image covariance matrix are computed and sorted in decreasing order, which allows the associated principal components to also be arranged in decreasing order (step 270). It has been found that the first few principal components will contain the bulk of the variance from the image covariance matrix. In a preferred implementation a predetermined number (e.g., 5) of the most significant principal components are retained (step 274), which substantially reduces the dimensionality of the hyperspectral image data 26 without appreciable loss of scene information.

It is observed that the hyperspectral image data 26 may be represented using this set of most significant principal components. In particular, the dot product of each pixel within the hyperspectral image data 26 with the eigenvector corresponding to a given principal component represents the contribution of such principal component to such pixel. This allows the hyperspectral image data 26 (as represented by its most significant principal components) to be partitioned into K small blocks of pixels where each such block represents a potential class (step 280). As is described below, similar ones of these potential classes are then merged using the Bhattacharyya distance, and the remaining classes consolidated into a predefined number of image endmembers through an iterative unmixing process.

Referring again to FIG. 4A, the mean and covariance of each of the K blocks of pixels is computed (step 290) in order to define a set of K potential classes. Next, the Bhattacharyya distance (B) between each of these K potential classes is computed based on their respective means ($\mu_n$) and covariances ($\Sigma_n$) as follows (step 300):

$$B = \frac{1}{4}(\mu_1 - \mu_2)^T \left(\sum_1 + \sum_2\right)^{-1}(\mu_1 - \mu_2) + \frac{1}{2}\ln\left(\frac{\left|\frac{\sum_1 + \sum_2}{2}\right|}{\sqrt{\left|\sum_1 \sum_2\right|}}\right) \quad (2)$$

Those of the potential K classes separated by less than a predefined distance B are then merged, thereby resulting in a smaller set of J classes (step 310). Consistent with the invention, the dependence of the Bhattacharyya on covariance tends to prevent classes representing a mixture of scene materials from being merged into other classes. This is desirable since each endmember should preferably represent the spectral signature of only a single material present in the scene defined by the hyperspectral image data 26.

Once the set of J classes have been established, the mean of each is computed (step 320). An unmixing process is then initiated to reduce the set of J classes to a desired number M (e.g., 30) of endmembers (step 330). This unmixing process begins by selecting the mean of the one of the J classes having the largest number of members (i.e., image pixels) as the first endmember (step 340). The remaining M-1 endmembers are then iteratively selected from the means of the remaining J-1 classes using the first endmember (and each subsequently selected endmember) in the following manner. In a first iteration, a first set of RMS residuals are computed by determining the magnitude of the vector difference between the first endmember and the mean of each of the remaining J-1 classes (step 350). Each of the RMS residuals within this first set is then weighted by multiplying each such residual by the number of members in the associated one of the remaining J-1 classes, thereby generating a first set of weighted RMS residuals (step 360). The mean of the one of the remaining J-1 classes associated with the largest weighted RMS residuals is then chosen as the second endmember (step 370), which concludes the first iteration.

During the second and each subsequent iteration, the previously selected endmembers are added in order to create an endmember set vector (step 380). A set of RMS residuals are computed by determining the magnitude of the vector difference between the endmember set vector and the mean of each of the remaining classes (step 390). Each of these RMS residuals is then weighted by multiplying each such residual by the number of members in the associated one of the remaining classes, thereby generating a set of weighted RMS residuals (step 400). The mean of the class associated with the largest weighted RMS residual is selected as the next endmember (step 410), which concludes the iteration. This iterative process is repeated until M endmembers have been selected and stored within the endmember spectral library 110 (step 420).

Adaptive Linear Unmixing

Figure 5:
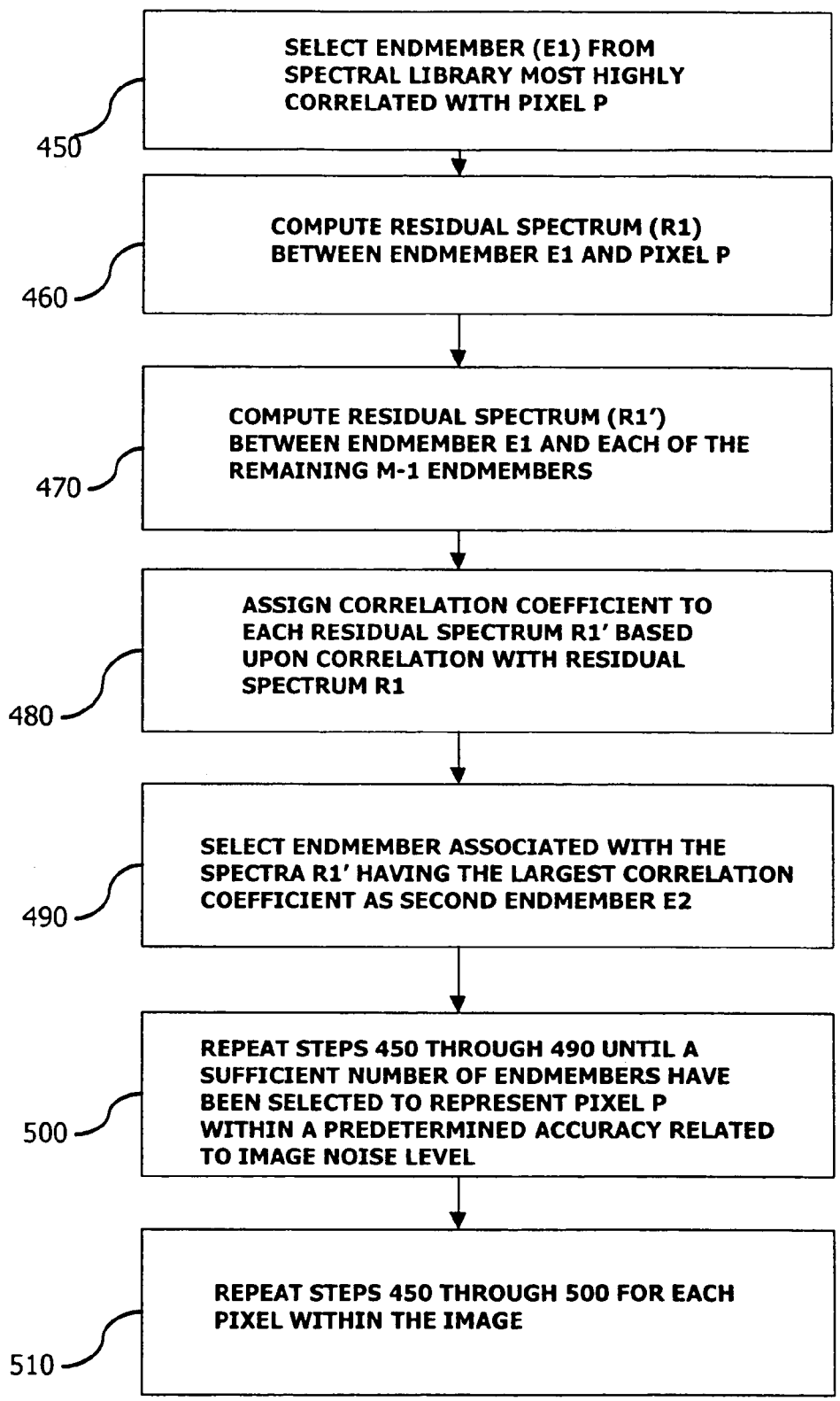
FIG. 5 is a high-level flow chart of a linear unmixing process performed by the adaptive linear unmixing module within the encoder of FIG. 2.

FIG. 5 is a high-level flow chart of a linear unmixing process performed by the adaptive linear unmixing module 120. Consistent with the invention, the linear unmixing module 120 functions to create a representation of each pixel spectra within the hyperspectral image data 26 using a linear combination of endmembers from the spectral library 110.

In a preferred embodiment this process is effected using a technique termed the Residual Correlation Method (RCM). The RCM contemplates finding an iterative solution to a set of linear mixing equations that model each pixel spectra as a linear combination of a set of endmembers. The linear mixing equations are based upon a Linear Mixing Model, which posits that the measured spectrum (i.e., the hyperspectral image data 26) is composed of the sum of individual reflectance spectra corresponding to particular materials (i.e., endmembers). Each endmember is weighted by the fractional area that the corresponding material occupies within the image field of view:

$$R_{meas} = \sum_{n=1}^{N} f_n R_n \quad (3)$$

where $R_{meas}$ is the measured spectrum as defined by the hyperspectral image data 26, and the $R_n$ are the component endmembers. The sum of the fractional weighting coefficients is unity; that is, the area covered by all of the materials in the scene must be equivalent to the total field of view.

$$\sum_{n=1}^{N} f_n = 1 \quad (4)$$

The difference between the spectrum for a given image pixel approximated by the right side of Equation (3) and the measured spectrum for such pixel ($R_{meas}$) defined by the hyperspectral image data 26 is referred to as the residual spectrum. The RCM proceeds on a pixel-by-pixel basis until a set of endmembers has been selected to collectively represent each image pixel defined by the hyperspectral image data 26.

Referring to FIG. 5, processing of a given image pixel (P) in accordance with the RCM is initiated by selecting from the spectral library 110 the endmember (E1) most highly correlated with the spectra of the pixel P (step 450). The residual spectrum (R1) between endmember E1 and pixel P is then computed (step 460). In addition, a residual spectrum (R1') is also computed between endmember E1 and each of the other M-1 endmembers within the spectral library 110 (step 470). The correlation between R1 and each of the other residual spectra R1' is then evaluated, and a corresponding correlation coefficient assigned to each of the M-1 residual spectra R1' (step 480). The endmember associated with the spectra R1' having the largest correlation coefficient is selected as the second endmember (E2) to be used in representing pixel P (step 490). This process (i.e., steps 450 through 490) is repeated until a set of endmembers have been selected for pixel P to be approximated sufficiently accurately by such set. Specifically, processing with respect to pixel P terminates when the residual difference between the value of $R_{meas}$ for pixel P and its estimated value using a linear combination of the previously selected endmembers (E1, E2, ...) drops below a predefined target value related to the RMS image noise level (e.g., 1, 2 or 3 sigma levels) (step 500). Steps 450 through 500 are then repeated for each pixel defined by the hyperspectral image data 26 (step 510).

Figure 6A:
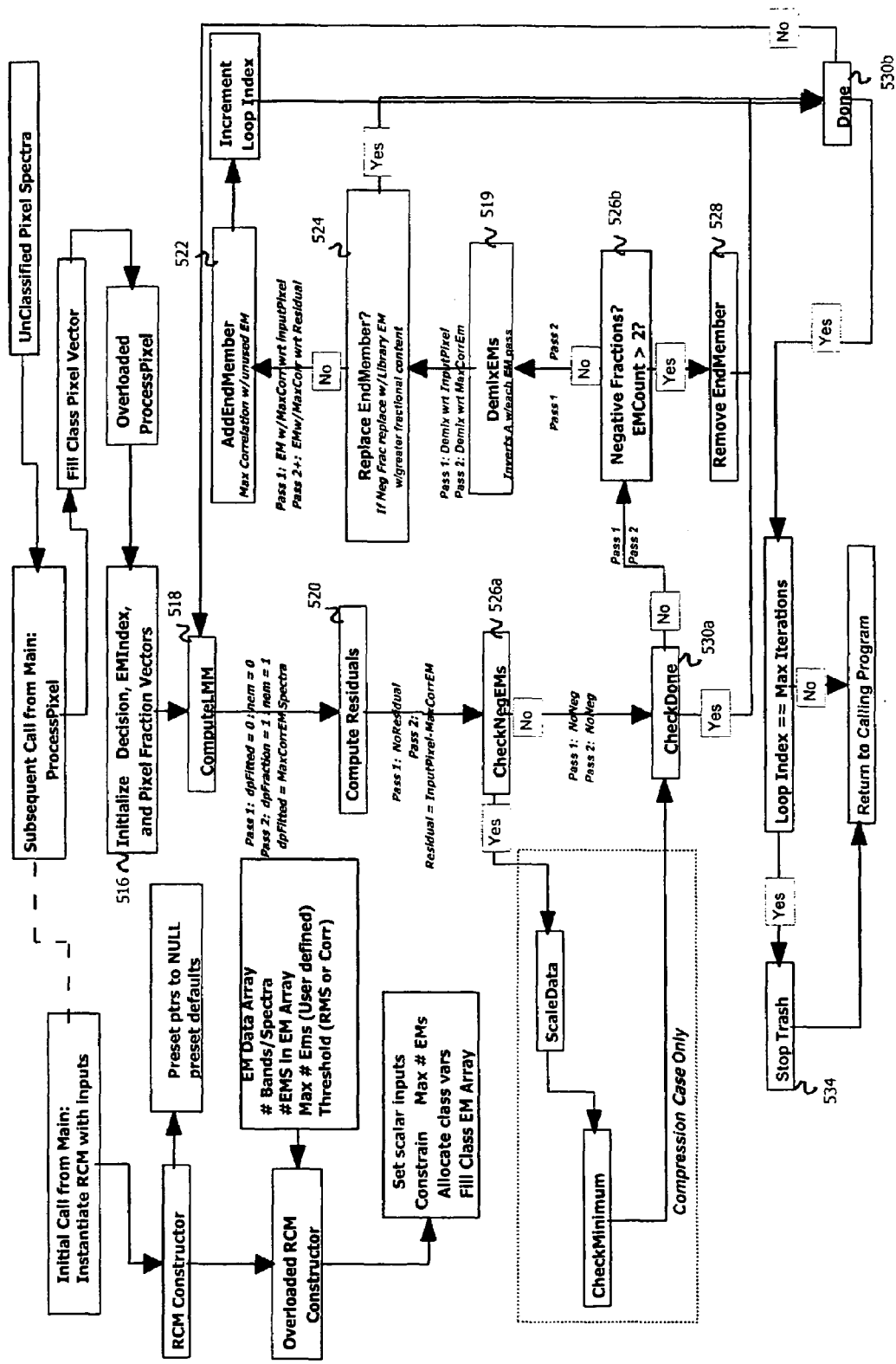
FIGS. 6A and 6B are flow charts of a preferred implementation of the adaptive linear unmixing process generally described with reference to FIG. 5.
Figure 6B:
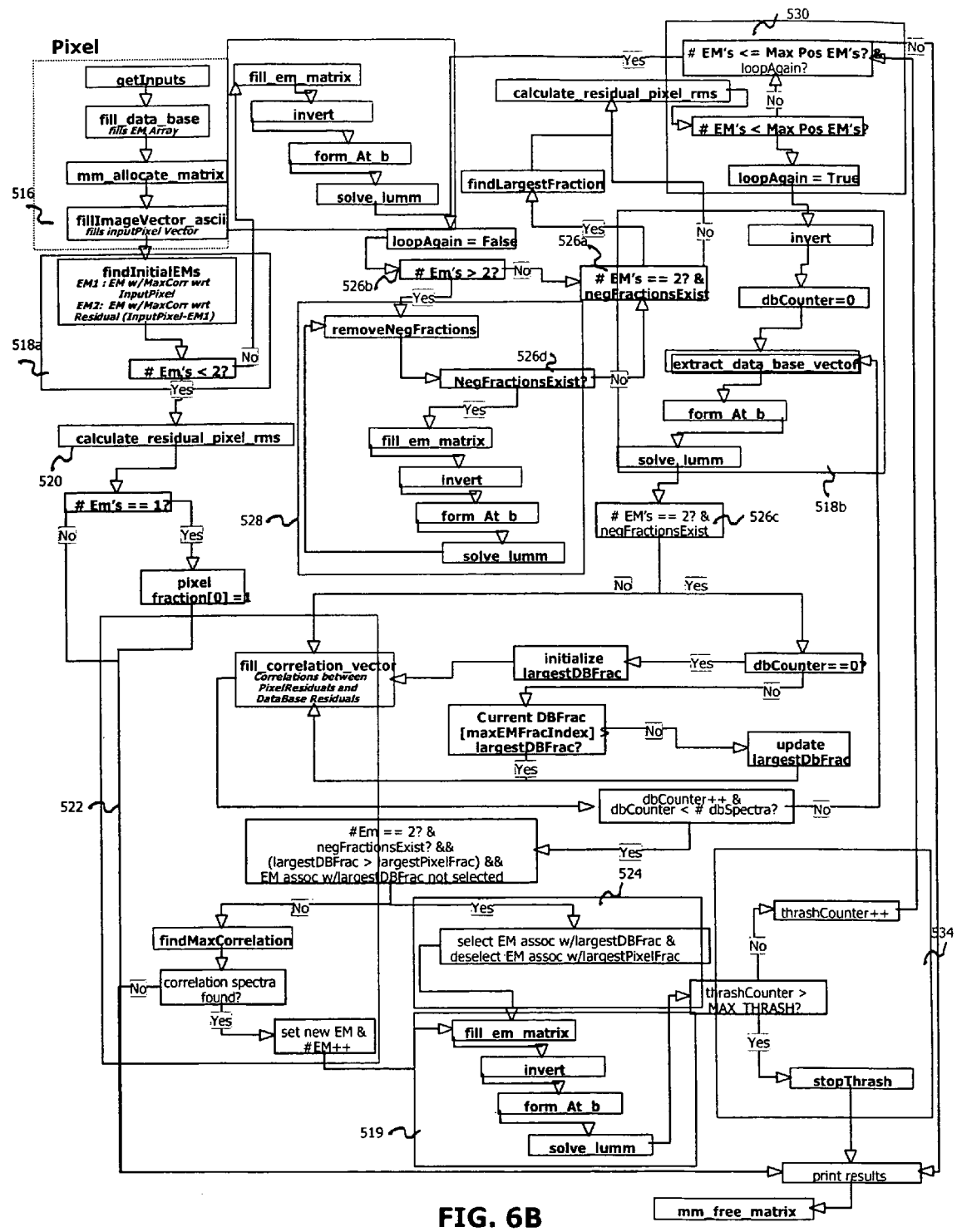

FIG. 6A is a top-level flow diagram, and FIG. 6B a more detailed flow chart, of a preferred implementation of the adaptive linear unmixing process described with reference to FIG. 5. The implementation of FIGS. 6A and 6B is enhanced in several respects relative to the unmixing process of FIG. 5. For example, although the sum of the weighting coefficients $f_n$ are constrained by equation (4) to be unity, the implementation of FIGS. 6A and 6B further requires that none of the weighting coefficients $f_n$ be less than zero (since each coefficient is representative of a non-negative physical area within the image field of view). In addition, the implementation of FIGS. 6A and 6B utilizes a correlation process not entirely predicated on a least squares fit to select the first endmember (E1). As is described below, use of this approach may require that certain endmembers selected during prior iterations be replaced during subsequent iterations.

The most significant functional blocks comprising the implementation of the adaptive linear unmixing process of FIGS. 6A and 6B are described below.

Initialize

The initialize function 516 instantiates the arrays utilized during execution of the Residual Correlation Method using the hyperspectral image data 26, reads in the complete set of potential endmember spectra from the endmember spectral library 110, and selects for processing an image pixel within the hyperspectral image data 26.

ComputeLMM; DemixEMS

The ComputeLMM function 518 performs an inversion of the equations defined by the Linear Mixing Model (i.e., steps 450 to 500 of FIG. 5) during the first iteration of the adaptive linear unmixing module 120. Following selection of the initial endmember E1 (step 450), during each subsequent iteration the DemixEMS function 519 adjusts the weighting coefficient $f_n$ associated with all endmembers selected during previous iterations. The ComputeLMM function 518 and the DemixEMS function 519 each (i) operate upon the set of potential endmember spectra from the endmember spectral library 110 and the hyperspectral image data 26, and (ii) output the weighting coefficient(s) $f_n$ of the endmember(s) which have been selected to represent the image pixel being processed.

Compute Residuals

The Compute Residuals function 520 operates upon the hyperspectral image data 26 and each selected endmember in order to compute the residual spectrum Rn (step 460) and the residual spectra Rn' (step 470).

AddEndMember

The AddEndMember function 522 computes the correlation between a given residual spectrum Rn and each associated residual spectra Rn'. The potential endmember spectrum associated with the residual spectrum Rn' most highly correlated with the residual spectrum Rn is selected as the next endmember used in representing the pixel being processed.

ReplaceEndMember

The ReplaceEndMember function 524 operates to replace a previously selected endmember with another potential endmember spectrum from the database 110 if the weighting coefficient $f_n$ associated with such spectrum would be larger than the coefficient $f_n$ associated with the previously selected endmember.

CheckNegEMS; RemoveEndMember

The CheckNegEMS function 526 checks to ensure that none of the weighting coefficients $f_n$ for the previously selected endmembers have been computed to be a negative fraction. In the event of computation of such a negative fraction, the associated endmember is removed from the set of previously selected endmembers.

CheckDone

The CheckDone function 530 determines when a sufficient number of endmembers have been selected to represent the pixel P being processed with a predetermined accuracy. Specifically, a sufficient number of pixels are deemed to have been selected when either (i) when the residual difference between pixel P and its estimated value using a linear combination of the previously selected endmembers (E1, E2, . . . ) drops below a predefined target value related to the RMS image noise level (e.g., 1, 2 or 3 sigma levels), or (ii) if all the potential endmember spectra within the library 110 have been evaluated and such residual difference remains above such predefined target value.

StopTrash

The StopTrash function 534 operates to cause the adaptive linear unmixing process of FIGS. 6A and 6B to terminate under certain conditions. In particular, the StopTrash function 534 monitors whether a potential endmember spectrum from the library 110 is alternately added to, and removed from, the set of selected endmembers during successive processing iterations. In such event the StopTrash function 534 terminates the linear unmixing process by posting a "Done" flag following completion of a specified number of iterations.

Encoding

Once the adaptive linear unmixing module 120 has identified a unique set of endmembers for each image pixel, the entire image is encoded by the encoding module 130. In a preferred embodiment the module 120 creates a file having a header specifying (i) image dimensions (length, width, number of spectral bands N), (ii) number of endmembers M, (iii) the shape of each such endmember, and (iv) gain and bias terms for each endmember. With respect to each pixel, the file preferably includes (i) flags indicative of which endmembers are used to represent each such pixel, and (ii) the coefficients associated with the endmembers for each such pixel. If the adaptive linear unmixing module is unable to identify a set of endmembers capable of approximating a given image pixel within the residual bound specified in step 500, then the pixel is not compressed. It is observed that the specified residual bound (e.g., 1, 2 or 3 sigma levels) will typically affect the image compression ratio ultimately achieved in a couple of respects. First, more endmembers are generally required to satisfy a smaller residual bound, thereby resulting in a reduction in the compression ratio. Secondly, a very small residual bound (e.g., 1 sigma level) could be expected to preclude many image pixels from being approximated by a set of endmembers within such a bound, thereby further reducing the compression ratio.

Image Reconstruction

Figure 7:
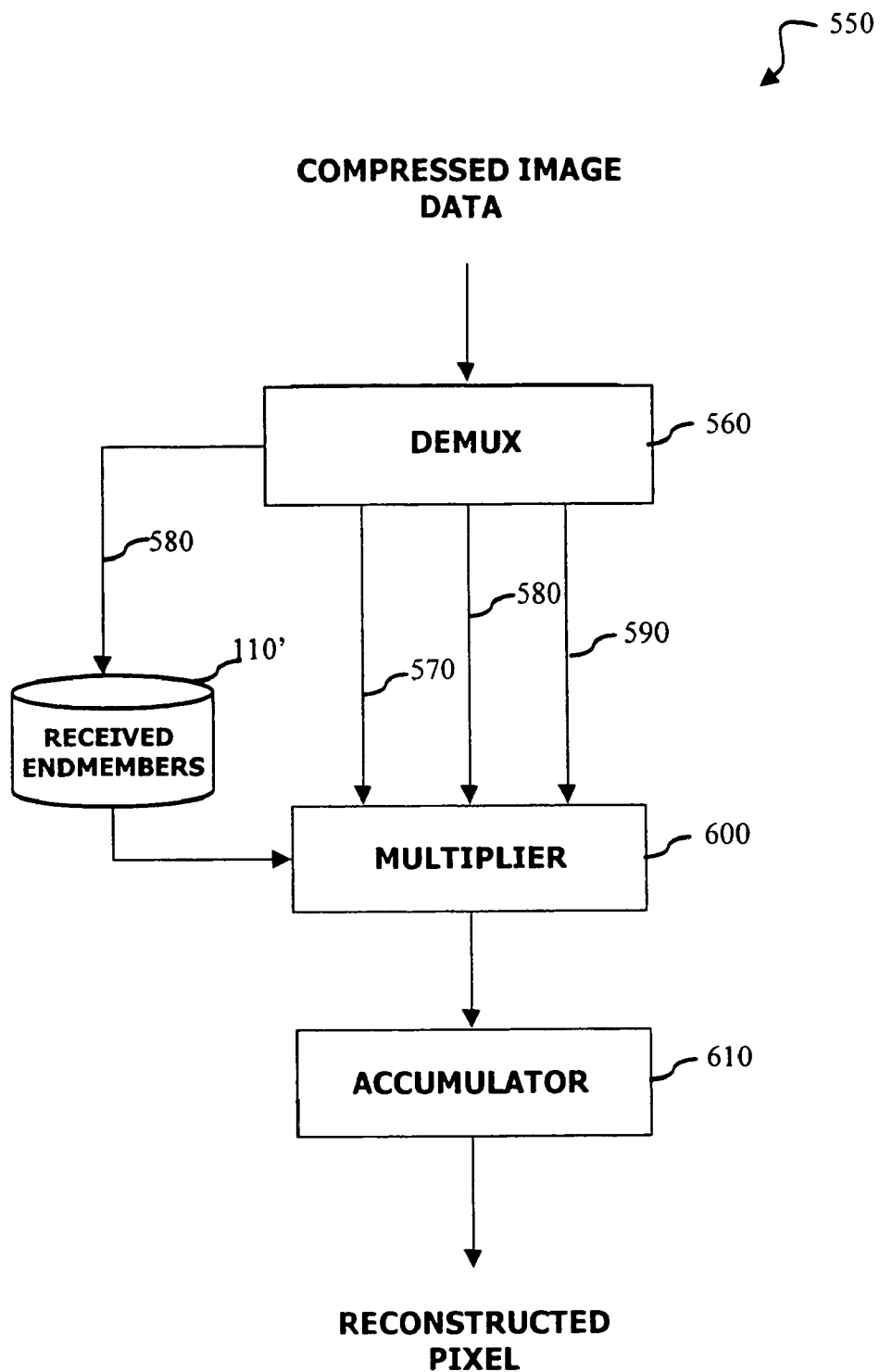
FIG. 7 is a block diagram of an image reconstruction module within a ground station or other facility disposed to reconstruct an image using a compressed image data file transmitted by the imaging system of FIG. 1.

FIG. 7 is a block diagram of an image reconstruction module 550 within a ground station or other facility disposed to reconstruct an image using a compressed image data file transmitted by the imaging system 10. In a preferred embodiment, each functional block of the reconstruction module is implemented as a software routine disposed to execute on a computer system of a type typically utilized for image processing applications. The reconstruction module includes a demultiplexer 560, which is provided with the compressed image data file by a ground station receiver (not shown). The demultiplexer produces (i) a signal 570 representing the image dimensions (number of pixels in length and width, and number of spectral bands N), and (ii) a signal 580 representing the number of endmembers M, the shape of each endmember, and gain and bias terms for each endmember. In addition, the demultiplexer generates a signal 590 indicative of (i) which endmembers are used to represent each such pixel, and (ii) the coefficients associated with the endmembers for each such pixel.

In a preferred implementation the module 550 reconstructs images on a pixel-by-pixel basis. In particular, a multiplier 600 multiplies each of the endmembers used to represent a given image pixel by a corresponding endmember coefficient to produce a set of intermediate products. These intermediate products are combined within an accumulator 610 in order to provide a reconstructed representation of the image pixel. This process is then repeated for each pixel defined by the compressed image data file.

Exemplary Software Implementation

FIGS. 8A and 8B are a computer program listing of a top-level MATLAB routine 700 implementing the adaptive hyperspectral data compression process described above with reference to FIGS. 3-6. Referring to FIG. 8A, a code segment 710 within the routine 700 implements the noise calculation process performed by the image noise calculator 100. A code segment 720 performs the principal components transformation described above with reference to FIG. 4A. Following completion of such principal components transformation, a code segment 730a (FIG. 8A) and 730b (FIG. 8B) implements the endmember selection process described with reference to FIGS. 4A and 4B beginning with step 280. It is observed that the code segment 730a and 730b calls the function rgrow 740 (FIGS. 9A-9C) and the function unconstr 750 (FIG. 11). The function rgrow 740 calls the function bdist 760 (FIG. 10), which is operative to compute the Bhattacharyya distance between a pair of Gaussian distributions.

Referring again to FIG. 8B, a code segment 770 performs the adaptive linear unmixing process described with reference to FIGS. 5, 6A and 6B. The code segment 770 calls the function rcmlpix 780 (FIGS. 12A-12B), which performs the bulk of such unmixing process. Finally, a code segment 790 implements, through a called function rcmcompw 800 (FIG. 13), the encoding process performed by the encoding module 130.

Although the above application has been described primarily in the context of particular embodiments and applications, one skilled in the art can readily appreciate that the teachings of the present invention may be applied to other embodiments and applications. Thus, the application is meant only to be limited by the scope of the appended claims.

What is claimed is:

1. A method of compressing spectral data corresponding to an image comprising a plurality of pixels, said method comprising:
   creating a set of potential endmembers;
   identifying a first plurality of said potential endmembers as a first set of endmembers based upon correlation of said first plurality of potential endmembers with a first spectral signature of a first pixel of said plurality of pixels; and
   representing said first pixel as a combination of said first set of endmembers, said combination being of a size related to a noise level of said image.

2. The method of claim 1 further including:
   identifying a second plurality of said potential endmembers as a second set of endmembers based upon correlation of said second plurality of potential endmembers with a second spectral signature of a second pixel of said plurality of pixels; and
   representing said second pixel as a combination of said second set of endmembers.

3. The method of claim 1 wherein said step of identifying includes:
   selecting a first of said potential endmembers most closely matching said first spectral signature as a first endmember within said first set of endmembers; and
   computing a first residual corresponding to a difference between said first endmember and said first spectral signature.

4. The method of claim 3 wherein said step of identifying further includes:
   computing a plurality of residuals corresponding to differences between said first endmember and remaining ones of said set of potential endmembers; and
   selecting a second endmember based upon correlation between said first residual and one of said plurality of residuals corresponding to said second endmember.

5. The method of claim 1 wherein said noise level comprises an average noise level, said method further including computing an said average noise level.

6. The method of claim 5 wherein said step of computing an average noise level includes:
   computing an average band noise level for each of a plurality of spectral bands inherent in said image; and
   converting said average band noise levels to said average noise level.

7. The method of claim 6 further including:
   computing an average band signal level for each of said plurality of spectral bands;
   computing a signal to noise ratio for each of said plurality of spectral bands based upon the applicable average band signal level and average band noise level; and
   removing any of said spectral bands from said image which exhibit a signal to noise ratio less than a predetermined threshold.

8. The method of claim 1 further including computing a residual between said first spectral signature and an approximation of said first spectral signature based upon said first set of endmembers, said residual being less than a predefined value related to noise inherent in said image.

9. A compression system for compressing spectral data corresponding to an image comprising a plurality of pixels, said system comprising:
   a database including a set of potential endmembers;
   an adaptive linear unmixing module for identifying a first plurality of said potential endmembers as a first set of endmembers based upon correlation of said first plurality of potential endmembers with a first spectral signature of a first pixel of said plurality of pixels; and
   an encoder for representing said first pixel as a combination of said first set of endmembers, said combination being of a size related to a noise level of said image.

10. The compression system of claim 9 wherein said adaptive linear unmixing module is disposed to identify a second plurality of said potential endmembers as a second set of endmembers based upon correlation of said second plurality of potential endmembers with a second spectral signature of a second pixel of said plurality of pixels, said encoder representing said second pixel as a combination of said second set of endmembers.

11. The compression system of claim 9 wherein said adaptive linear unmixing module additionally operates to:
  select one of said potential endmembers most closely matching said first spectral signature as a first endmember included within said first set of endmembers; and
  compute a first residual corresponding to a difference between said first endmember and said first spectral signature.

12. The compression system of claim 11 wherein said adaptive linear unmixing module is further operative to:
  compute a plurality of residuals corresponding to differences between said first endmember and remaining ones of said potential endmembers; and
  select another one of said potential endmembers as a second endmember based upon correlation between said first residual and one of said plurality of residuals corresponding to said second endmember.

13. The compression system of claim 9 wherein said noise level comprises an average noise level, said system further including an image noise calculation module operative to compute an said average noise level for said image wherein said adaptive linear unmixing module continues to add ones of said potential endmembers to said first set of endmembers until a residual between said first spectral signature and an approximation of said first spectral signature based upon said first set of endmembers becomes less than a predefined target value relating to said average noise level.

14. The compression system of claim 13 wherein said image noise calculation module includes:
  means for computing an average band noise level for each of a plurality of spectral bands inherent in said image;
  means for computing an average band signal level for each of said plurality of spectral bands;
  means for computing a signal to noise ratio for each of said plurality of spectral bands based upon the applicable average band signal level and average band noise level; and
  means for removing any of said spectral bands from said image which exhibit a signal to noise ratio less than a predetermined threshold.

15. An article of manufacture, which comprises a computer readable medium having stored therein a computer program carrying out a method of compressing spectral data corresponding to an image comprising a plurality of pixels, the computer program comprising:
  (a) a first code segment for creating a set of potential endmembers;
  (b) a second code segment for identifying a first plurality of said potential endmembers as a first set of endmembers based upon correlation of said first plurality of potential endmembers with a first spectral signature of a first pixel of said plurality of pixels; and
  (c) a third code segment for representing said first pixel as a combination of said first set of endmembers, said combination being of a size related to a noise level of said image.

16. The article of manufacture of claim 15 in which the second code segment identifies a second plurality of said potential endmembers as a second set of endmembers based upon correlation of said second plurality of potential endmembers with a second spectral signature of a second pixel of said plurality of pixels, and in which the third code segment represent said second pixel as a combination of said second set of endmembers.

17. The article of manufacture of claim 15 wherein said noise level comprises an average noise level and in which the computer program includes a fourth code segment for computing an said average noise level for said image and for determining a number of said potential endmembers to be used in representing said first pixel based upon said average noise level.

18. The article of manufacture of claim 17 in which the fourth code segment:
  computes an average band noise level for each of a plurality of spectral bands inherent in said image;
  computes an average band signal level for each of said plurality of spectral bands;
  computes a signal to noise ratio for each of said plurality of spectral bands based upon the applicable average band signal level and average band noise level; and
  removes any of said spectral bands from said image which exhibit a signal to noise ratio less than a predetermined threshold.

19. A method for reconstructing an image comprising a plurality of pixels from a compressed data stream, said method comprising the steps of:
  extracting a set of endmembers from said data stream wherein said set is of a size related to a noise level of said image;
  extracting from said data stream information identifying a first plurality of said endmembers corresponding to a first pixel of said plurality of pixels;
  extracting from said data stream a first plurality of endmember coefficients, each of said endmember coefficients corresponding to one of said first plurality of endmembers;
  multiplying each of said first plurality of endmembers by a corresponding one of said first plurality of endmember coefficients to produce a first plurality of intermediate products; and
  combining said first plurality of intermediate products.

20. The method of claim 19 further including the steps of:
  extracting from said data stream information identifying a second plurality of said endmembers corresponding to a second pixel of said plurality of pixels;
  extracting from said data stream a second plurality of endmember coefficients, each of said endmember coefficients corresponding to one of said second plurality of endmembers;
  multiplying each of said second plurality of endmembers by a corresponding one of said second plurality of endmember coefficients to produce a second plurality of intermediate products; and
  combining said second plurality of intermediate products.

21. The method of claim 19 wherein the number of said first plurality of endmembers is based upon an average noise level of said image.

22. An article of manufacture, which comprises a computer readable medium having stored therein a computer program carrying out a method for reconstructing an image comprising a plurality of pixels from a compressed data stream, the computer program comprising:
  a first code segment for extracting a set of endmembers from said data stream wherein a size of said set is related to a noise level of said image;
  a second code segment for extracting from said data stream information identifying a first plurality of said endmembers corresponding to a first pixel of said plurality of pixels; and
  a third code segment for extracting from said data stream a first plurality of endmember coefficients, each of said endmember coefficients corresponding to one of said first plurality of endmembers;

a fourth code segment for multiplying each of said first plurality of endmembers by a corresponding one of said first plurality of endmember coefficients to produce a first plurality of intermediate products; and a fifth code segment for combining said first plurality of intermediate products.

* * * * *